United States Patent
Carpenter

(10) Patent No.: US 10,835,846 B1
(45) Date of Patent: Nov. 17, 2020

(54) POOL SKIMMER BASKET GRAPNEL

(71) Applicant: Joseph Walter Carpenter, Houston, TX (US)

(72) Inventor: Joseph Walter Carpenter, Houston, TX (US)

( * ) Notice: Subject to any disclaimer, the term of this patent is extended or adjusted under 35 U.S.C. 154(b) by 0 days.

(21) Appl. No.: 16/528,719

(22) Filed: Aug. 1, 2019

(51) Int. Cl.
| | |
|---|---|
| *B01D 29/96* | (2006.01) |
| *E04H 4/12* | (2006.01) |
| *B01D 29/35* | (2006.01) |
| *B25J 1/04* | (2006.01) |

(52) U.S. Cl.
CPC .............. *B01D 29/96* (2013.01); *B01D 29/35* (2013.01); *B25J 1/04* (2013.01); *E04H 4/1272* (2013.01)

(58) Field of Classification Search
CPC ........ B01D 29/96; B01D 29/35; E04H 4/1272
USPC ............ 210/238, 448, 167.1; 294/81.6, 99.2
See application file for complete search history.

(56) References Cited

U.S. PATENT DOCUMENTS

| | | | |
|---|---|---|---|
| 2004/0045895 A1* | 3/2004 | Bonelli | B01D 29/23 210/497.1 |
| 2009/0243318 A1 | 10/2009 | Pratt | |
| 2014/0015267 A1* | 1/2014 | Smith | E04H 4/16 294/28 |
| 2014/0327257 A1 | 11/2014 | Vazquez | |
| 2018/0147507 A1* | 5/2018 | Angelino | B01D 29/11 |

* cited by examiner

*Primary Examiner* — Fred Prince
(74) *Attorney, Agent, or Firm* — Gugliotta & Gugliotta LPA

(57) ABSTRACT

An improved pool skimmer is provided in which a skimmer basket grapnel having a pair of aligned removable paddles adapted for attachment to a skimmer basket sidewall and for blocking suction within a skimmer basket volume. The paddles each include a vertically sliding gate which, when opened, released vacuum within the skimmer basket. This allows the basket to be easily removed. The sliding gate stems articulate vertically to open and close. The apex of the stems attaches to a handle, whereupon an upward pulling motion actuates the two paddle gates open. Once a vacuum seal is broken, the attachment to the basket sidewall allows further upward motion to remove the basket from its skimmer housing. The instant abstract is neither intended to define the invention disclosed in this specification nor intended to limit the scope of the invention in any way.

12 Claims, 6 Drawing Sheets

POOL SKIMMER BASKET GRAPNEL

RELATED APPLICATIONS

There are no previously filed, nor currently any co-pending applications, anywhere in the world.

BACKGROUND OF THE INVENTION

1. Field of the Invention

The present invention relates generally to swimming pool systems and, more particularly, to improvements to pool skimmer systems.

2. Description of the Related Art

Swimming pools generally have two types of water cleaning systems: water filters; and skimmers. Outdoor pools are often contaminated by a wide array of objects such as leaves, plant debris, mown grass, dirt, algae, insects, etc. Accordingly, filtration systems are often installed in the pool to continuously circulate some of the pool water through a pump system having a filter and an entry port located near the surface. These entry ports often become clogged with debris since their entry radius is limited. Also, since debris often sinks when it becomes waterlogged, effective cleaning is limited by the size of the entry port, the number and location of the entry ports, and the strength of the intake currents produced by the filtration system pumps. In addition, the resulting complex system is not optimally adaptable to a wide range of pool geometries.

Several styles of skimmer filters currently exist in the form of a pool filter cleaning or skimmer basket. The standard version for many pools is a simple plastic basket that a person will have to grab the side of the basket to get it out of the vacuum area. The next level are baskets that have a metal bar to grasp as one pulls the basket out. At the upper end of the scale are baskets that have rotating handles that fall off the top of the basket much like a handle for a bucket falls off to the side of the bucket.

All of these existing variations suffer from a common problem: the baskets are not easily removed for cleaning while the pump is running. Such baskets are difficult to remove from their skimmer housings and result in frequently broken handles. Current 'make-shift' solutions of a separate hook accessory may be used, but no universal solution currently exists.

A search of the prior art did not disclose any patents that read directly on the claims of the instant invention; however, the following references were considered related.

U.S. Patent Publication 2014/0327257, issued in the name of Vazquez, provides a tool designed to remove a swimming pool skimmer basket for cleaning without having to touch the debris trapped therein. The tool provided takes the general appearance of a pair of tongs having a uniquely constructed grasping portion. The grasping portion of the tongs provides several ways to remove the skimmer basket from the skimmer for cleaning and facilitates removal of debris directly from the skimmer basket.

And, U.S. Patent Publication 2009/0243318, issued in the name of Pratt, discloses a device and method for lifting a pool skimmer basket. The lifting tool enables a user to engage and remove a skimmer basket for cleaning without having to contact the debris accumulated within the basket. The skimmer basket lifting tool comprises a lifting handle which has both a proximal and a distal end, a base portion, including an attachment point for engaging the distal end of the lifting handle, and a pair of opposed skimmer basket crossbar engagement elements extending downward from the base portion. The opposed crossbar engagement elements are oriented such that rotation of the base portion, following insertion of the base portion into a skimmer basket housing, results in reversible engagement of the opposed crossbar engagement elements with the skimmer basket crossbar. This reliable, reversible engagement enables the skimmer basket to be lifted from the skimmer basket housing.

Consequently, a need still exists for improved devices that allow any existing style of skimmer baskets to be easily removed while the pump is running.

SUMMARY OF THE INVENTION

It is thus an object of the present invention to provide a method handling and removing a swimming pool skimmer system filter basket.

It is a feature of the present invention to provide a system capable of affixing to and removing many existing styles of pool skimmer filter baskets from their skimmer housings.

Briefly described according to the present invention a skimmer basket grapnel is provided having a pair of aligned removable paddles adapted attachment to a skimmer basket sidewall and for blocking suction within a skimmer basket volume. The paddles each include a vertically sliding gate which, when opened, released vacuum within the skimmer basket. This allows the basket to be easily removed. The sliding gate stems articulate vertically to open and close. The apex of the stems attaches to a handle, whereupon an upward pulling motion actuates the two paddle gates open. Once a vacuum seal is broken, the attachment to the basket sidewall allows further upward motion to remove the basket from its skimmer housing.

It is a feature of the present invention to provide an easily accessible handle adaptable for attachment to any basket.

It is another advantage of the present invention to provide a system for releasing any vacuum pressure that may exist within a fouled basket filter.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
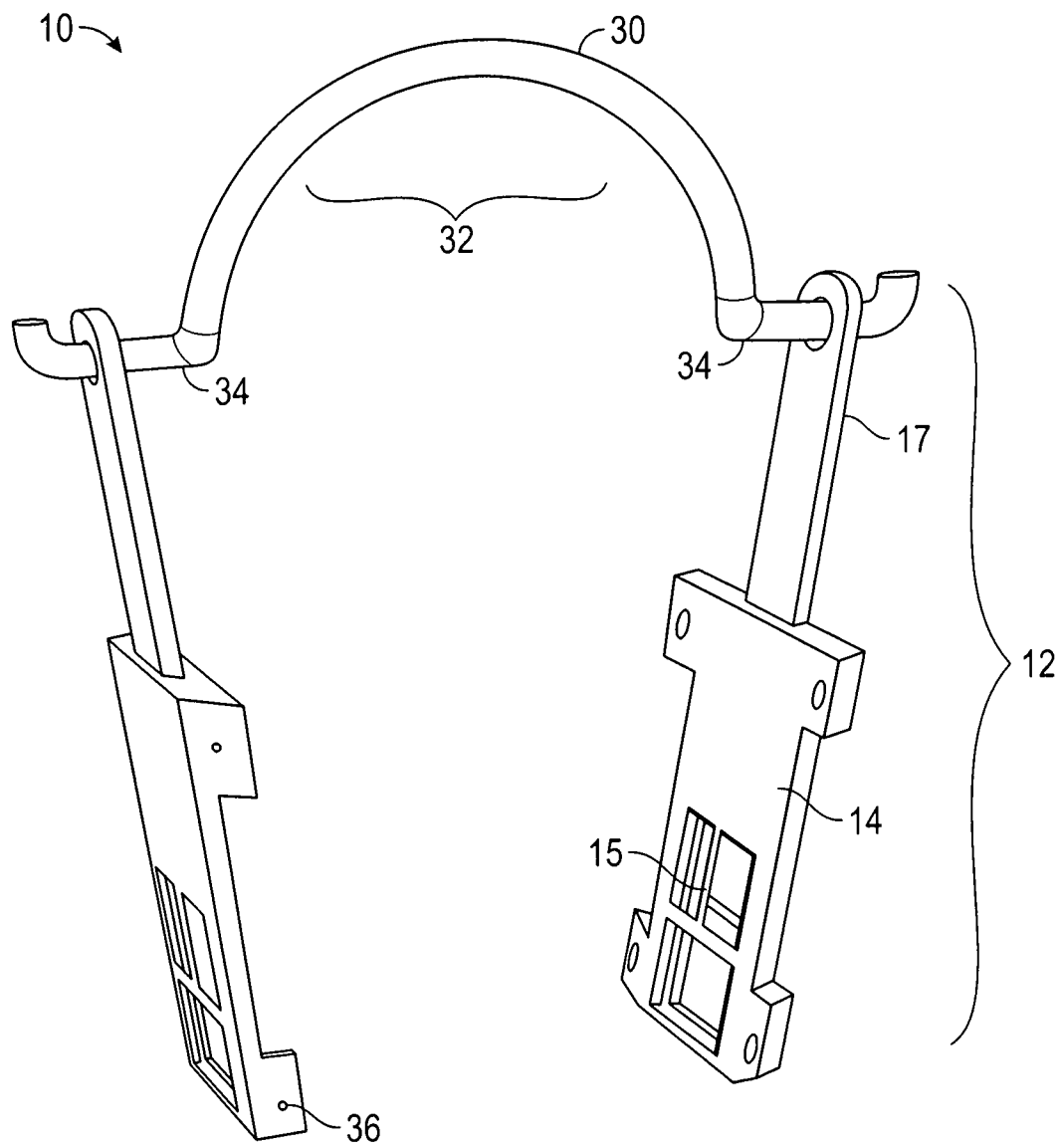
FIG. 1 is a front perspective view of a pool skimmer basket grapnel according to a preferred embodiment of the present invention, shown herein in an open configuration.
Figure 2:
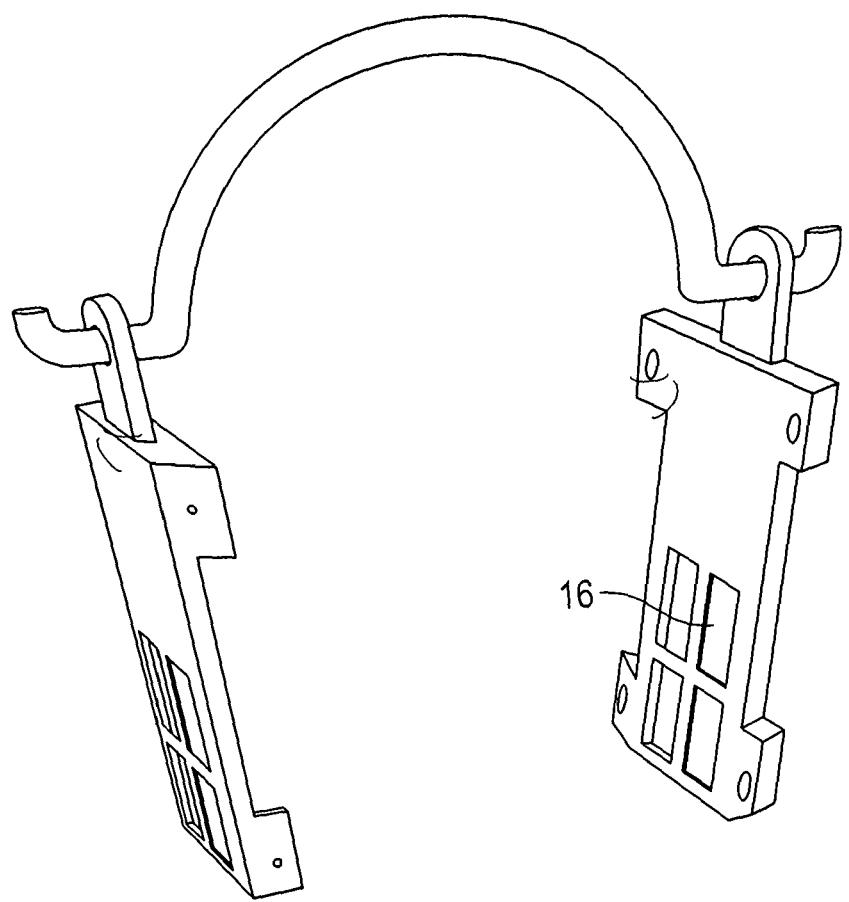
FIG. 2 is a front perspective view thereof shown in a closed configuration.
Figure 3:
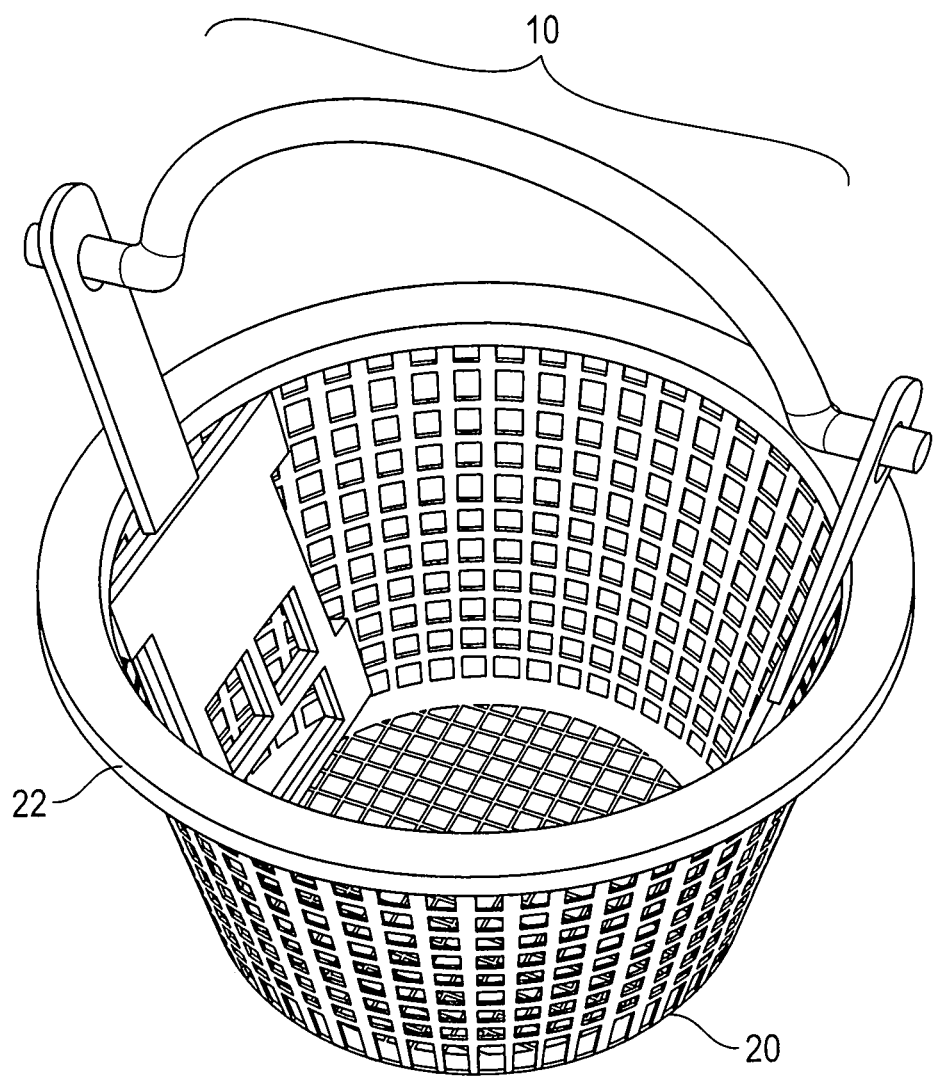
FIG. 3 is a top perspective view of the pool skimmer basket grapnel of FIG. 1 shown in conjunction with a pool skimmer basket.
Figure 4:
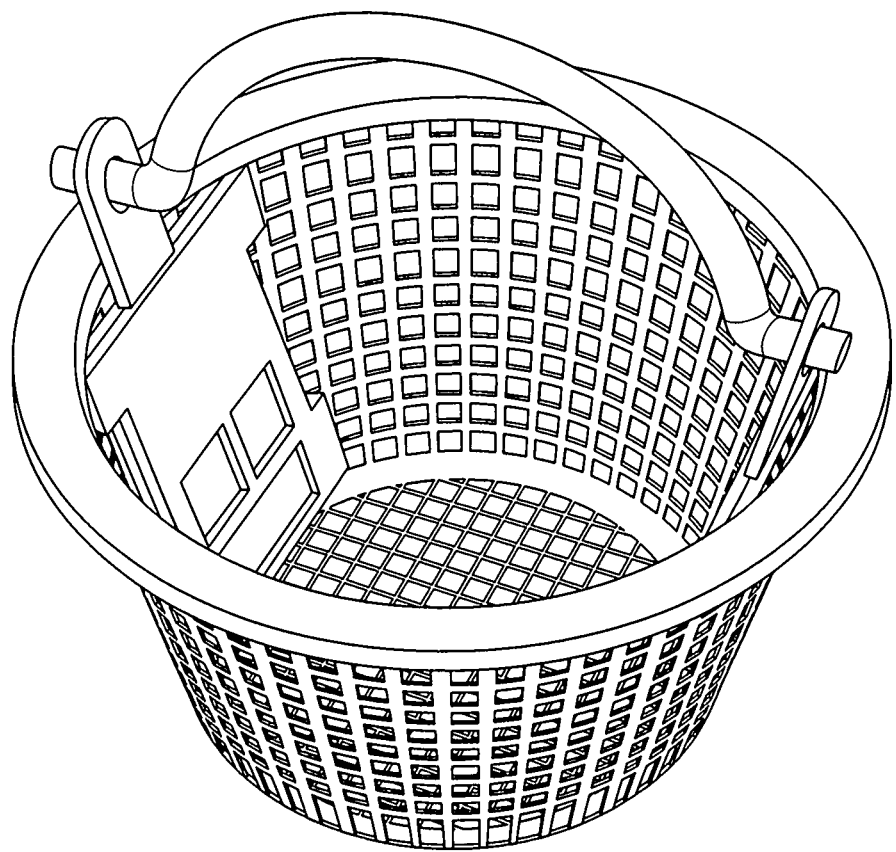
FIG. 4 is a top perspective view of the pool skimmer basket grapnel of FIG. 2 shown in conjunction with a pool skimmer basket.
Figure 5:
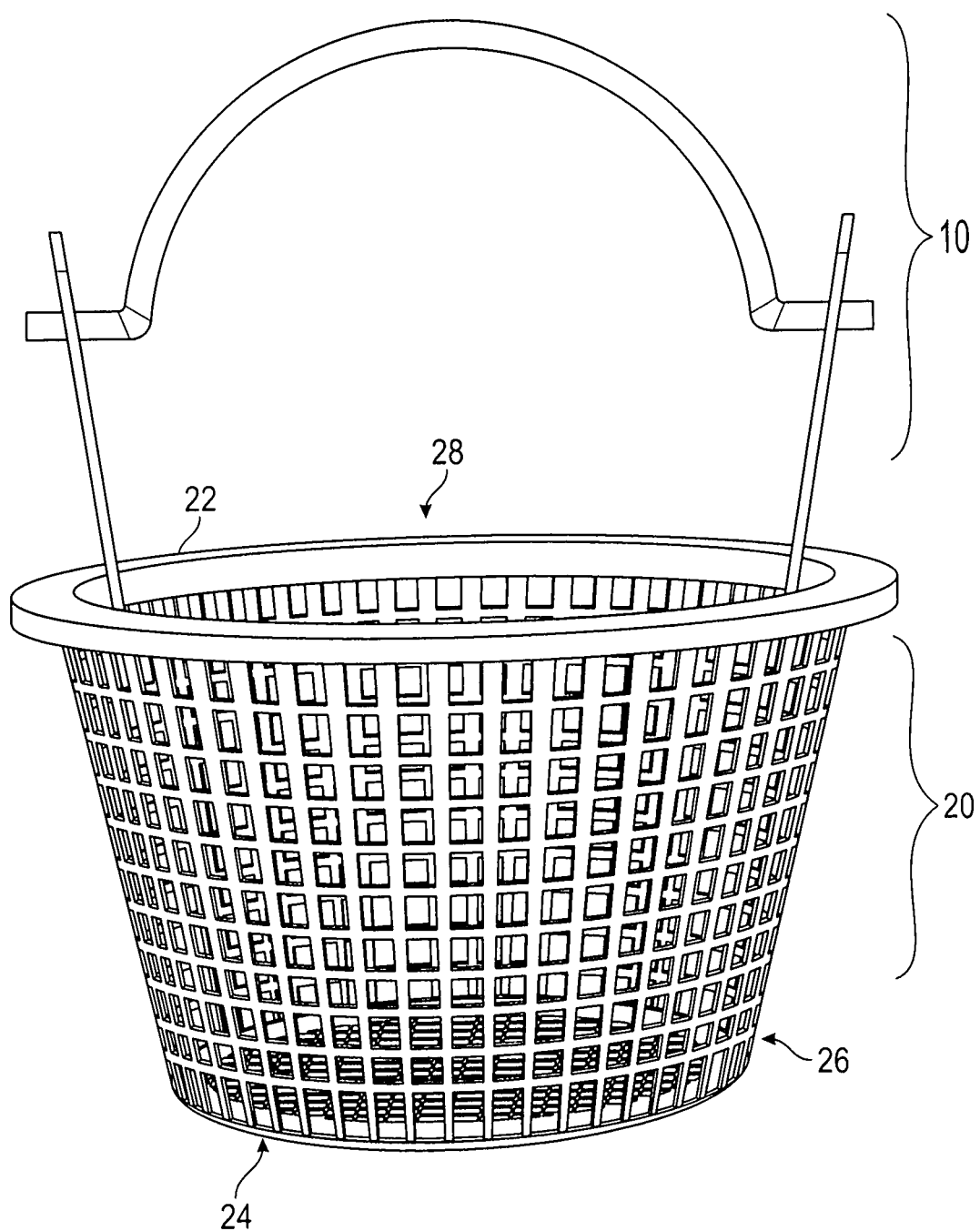
FIG. 5 is a front perspective view of the pool skimmer basket grapnel of FIG. 1 shown in conjunction with a pool skimmer basket.
Figure 6:
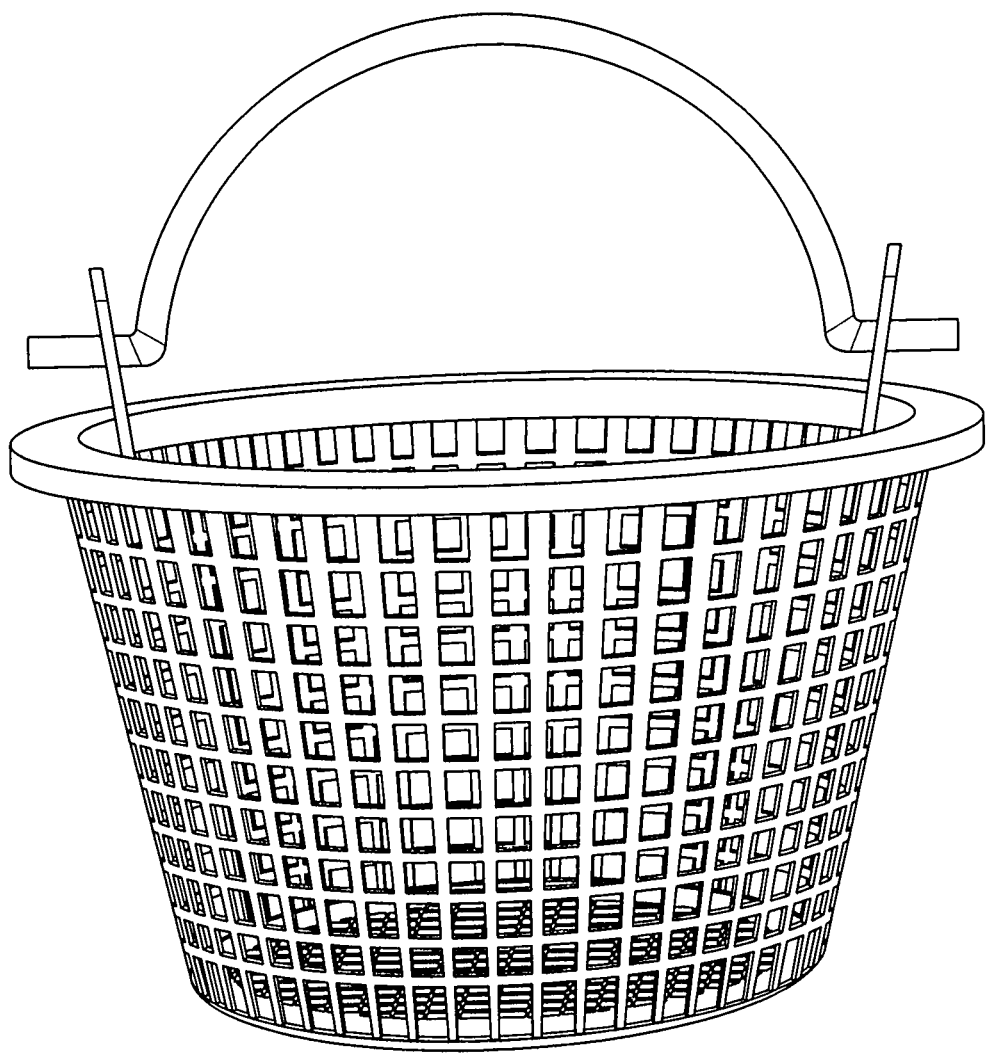
FIG. 6 is a top perspective view of the pool skimmer basket grapnel of FIG. 2 shown in conjunction with a pool skimmer basket.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. DETAILED DESCRIPTION OF THE FIGURES

Referring now to the drawings, wherein like reference numerals indicate the same parts throughout the several views, a skimmer basket grapnel, generally noted as 10, is shown according to the preferred embodiment of the present invention. The grapnel 10 is used in conjunction with a pool skimmer filter basket 20.

The grapnel 10 is provided having a pair of aligned removable paddles 12. The paddles 12 are affixed within the filter basket 20 and aligned with one another as better described in greater detail below. Each paddle 12 is formed of a lower body 14 forming an aperture 15. A valve gate 16 is slidably supported within the body 14 such as to occlude the aperture 15 when lowered. A stem 17 is affixed to and extends upward from the body of the valve gate 16. A handle 30 is rotatably affixed at or near the upper terminus of the stems 17. While the particular configuration for the handle 30 may be subject to various design modifications within the scope of the presently intended functional equivalent, as shown the handle 30 has an arcuate central grasping portion 32 opposed by linear connection rods 34. With each connection rod 34 rotatably supported by the opposed stems 17, an upward motion on the grasping portion 32 provides an upward urging force to each stem 17.

The pool skimmer filter basket 20 need not be any different from exemplary filter baskets otherwise currently available. Such filter baskets 20 are generally a molded plastic mesh having a circular upper rim 22 and a plan lower base 24. A sidewall 26 of mesh may form a cylinder or a frustum between the upper opening 28 and the lower base 24.

As indicated above, the grapnel 10 is used in conjunction with a pool skimmer filter basket 20. This may be accomplished by attachment of the paddle bodies 14 to the sidewall 26 of the skimmer basket. While various conventional attachments are envisioned, one or more flukes or hooks 36 may impinge within the mesh openings of the sidewall 26.

2. OPERATION OF THE PREFERRED EMBODIMENT

In operation, the grapnel 10 is used in conjunction with a skimmer filter basket 20, or otherwise modifies an existing skimmer basket 20 in a manner which allows the basket 20 to be easily removed while the pump is running and while debris is contained therein. This is accomplished by a sturdy handle connected to two moveable paddles which lift with the handle. These paddles release the vacuum lock and allow the water to rush in, freeing the basket to easily be removed in a single swift motion without the need to clear debris. The paddle bodies 14 may block suction from forming within a skimmer basket volume. The paddles 12 each include a vertically sliding gate 14 which, when opened, released vacuum within the skimmer basket 20. This allows the basket 20 to be easily removed. The sliding gate stems articulate vertically to open and close. The apex of the stems attaches to a handle, whereupon an upward pulling motion actuates the two paddle gates open. Once a vacuum seal is broken, the attachment to the basket sidewall allows further upward motion to remove the basket from its skimmer housing.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as is suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical*, 520 US 17 (1997) or *Festo Corp. v. Shoketsu Kinzoku Kogyo Kabushiki Co.*, 535 U.S. 722 (2002), or other similar caselaw or subsequent precedent should not be made if any future claims are added or amended subsequent to this Patent Application.

What is claimed is:

1. A skimmer basket removal system comprising:
    a pair of aligned paddies adapted for attachment to a mesh sidewall of a pool skimmer basket, each said paddle comprising:
        a lower body forming an aperture;
        a valve gate slidably supported within the body for occluding the aperture when lowered;
        a stem affixed to and extends upward from the body of the valve gate; and
        a handle rotatably affixed at or near an upper terminus of each said stem.

2. The skimmer basket removal system of claim 1, wherein said handle further comprises:
    an arcuate central grasping portion terminated at opposing ends by a linear connection rod;
    each said connection rod rotatably supported by each said stem; whereby an upward motion on the grasping portion provides an upward urging force to each stem.

3. The skimmer basket removal system of claim 2, further an attachment mechanism extending from an outer face of each body for impinging within mesh openings of a filter basket sidewall.

4. The skimmer basket removal system of claim 3, wherein said attachment mechanism comprises one or more flukes or hooks.

5. The basket removal system of claim 3, wherein said grapnel further comprises:
    a pair of aligned paddles adapted for attachment to a mesh sidewall of a pool skimmer basket, each said paddle comprising:
        a lower body forming an aperture;
        a valve gate slidably supported within the body for occluding the aperture when lowered;
        a stem affixed to and extends upward from the body of the valve gate; and
    a handle rotatably affixed at or near an upper terminus of the stems.

6. The skimmer basket removal system of claim 5, wherein said handle further comprises:
    an arcuate central grasping portion terminated at opposing ends by a linear connection rod;
    each said connection rod rotatably supported by each said stem; whereby an upward motion on the grasping portion provides an upward urging force to each stem.

7. The basket removal system of claim 6, wherein said grapnel further comprises an attachment mechanism extending from an outer face of each body for impinging within mesh openings of a filter basket sidewall.

8. The basket removal system of claim 7, wherein said attachment mechanism comprises one or more flukes or hooks.

9. The skimmer basket removal system of claim 5, wherein said grapnel further comprises an attachment mechanism extending from an outer face of each body for impinging within mesh openings of a filter basket sidewall.

10. The basket removal system of claim 9, wherein said attachment mechanism comprises one or more flukes or hooks.

11. The skimmer basket removal system of claim 1, further an attachment mechanism extending from an outer face of each body for impinging within mesh openings of a filter basket sidewall.

12. The skimmer basket removal system of claim 11, wherein said attachment mechanism comprises one or more flukes or hooks.

* * * * *